United States Patent
Tao et al.

(10) Patent No.: US 8,952,107 B2
(45) Date of Patent: Feb. 10, 2015

(54) THERMOPLASTIC MELT-MIXED COMPOSITION WITH POLYETHEROL HEAT STABILIZER

(71) Applicant: E I du Pont de Nemours and Company, Wilmington, DE (US)

(72) Inventors: Yuefei Tao, Hockessin, DE (US); Lech Wilczek, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 7 days.

(21) Appl. No.: 13/915,983

(22) Filed: Jun. 12, 2013

(65) Prior Publication Data

US 2013/0338263 A1    Dec. 19, 2013

Related U.S. Application Data

(60) Provisional application No. 61/659,005, filed on Jun. 13, 2012.

(51) Int. Cl.
| | |
|---|---|
| *C08F 283/04* | (2006.01) |
| *C08L 77/06* | (2006.01) |
| *C08G 59/18* | (2006.01) |
| *C08L 77/00* | (2006.01) |
| *C08L 77/02* | (2006.01) |

(52) U.S. Cl.
CPC ............... *C08L 77/06* (2013.01); *C08G 59/182* (2013.01); *C08L 77/00* (2013.01); *C08L 77/02* (2013.01); *C08G 2650/56* (2013.01)
USPC .......................................... 525/423; 525/420

(58) Field of Classification Search
USPC .................................................. 525/420, 423
See application file for complete search history.

(56) References Cited

U.S. PATENT DOCUMENTS

| | | | |
|---|---|---|---|
| 2,462,047 A | 2/1949 | Wyler | |
| 2,994,673 A | 8/1961 | Capron | |
| 3,920,602 A * | 11/1975 | Freed | 524/456 |
| 4,137,212 A | 1/1979 | Theysohn et al. | |
| 4,315,086 A | 2/1982 | Ueno | |
| 4,552,912 A | 11/1985 | Williams | |
| 4,567,235 A | 1/1986 | Sasaki et al. | |
| 5,177,144 A | 1/1993 | Torre et al. | |
| 5,296,556 A | 3/1994 | Frihart | |
| 5,605,945 A | 2/1997 | Sayed | |
| 5,612,448 A | 3/1997 | Frihart | |
| 6,025,463 A | 2/2000 | Pfaendner et al. | |
| 6,028,129 A | 2/2000 | Pfaendner et al. | |
| 6,136,944 A | 10/2000 | Stewart | |
| 6,274,697 B1 | 8/2001 | Zahr | |
| 7,405,249 B2 | 7/2008 | Kim | |
| 2001/0056145 A1 | 12/2001 | Martens et al. | |
| 2005/0228109 A1 | 10/2005 | Chandra et al. | |
| 2008/0262133 A1 | 10/2008 | Eibeck et al. | |
| 2008/0262311 A1 | 10/2008 | Itou et al. | |
| 2008/0269375 A1 | 10/2008 | Park et al. | |
| 2009/0260761 A1 | 10/2009 | Krawinkel | |
| 2010/0028581 A1 | 2/2010 | Palmer et al. | |
| 2010/0029819 A1 | 2/2010 | Palmer et al. | |
| 2010/0090174 A1 | 4/2010 | Weber et al. | |
| 2012/0010343 A1 | 1/2012 | Prusty et al. | |
| 2012/0196961 A1 | 8/2012 | Kobayashi et al. | |
| 2012/0196962 A1 | 8/2012 | Kobayashi et al. | |
| 2012/0321829 A1 | 12/2012 | Bayer et al. | |

FOREIGN PATENT DOCUMENTS

| | | |
|---|---|---|
| EP | 0196194 | 1/1989 |
| EP | 0190001 | 6/1989 |
| EP | 1041109 | 4/2000 |
| GB | 872381 | 7/1961 |
| JP | 197595359 | 7/1975 |
| JP | 201126446 | 10/2011 |
| WO | 2011157615 | 12/2011 |

OTHER PUBLICATIONS

Japanese Abstract JP-60181159A, Rifid, Impact-Resistant Polyamide . . . Olefins. Inventor: Mori K, Assignee Dainippon Ink & Chem KK.
Korean Abstract KR20020010356A, Polyamide Resin Composition, Inventor: Choi Jin Myeong.
Principles of Polymerization, Second Edition, George Odian, John Wiley & Sons, pp. 116-119.

\* cited by examiner

*Primary Examiner* — Robert Jones, Jr.

(57) ABSTRACT

Disclosed is a thermoplastic melt-mixed composition including: a) a polyamide resin; b) a polyetherol compound provided by reacting: b1) one or more polyepoxy compound having at least two or more epoxy groups; and b2) one or more polyhydric alcohols having two or more hydroxyl groups; c) 10 to 60 weight percent of reinforcing agent; d) 0 to 30 weight percent polymeric toughener; and e) 0 to 10 weight percent further additives. Also disclosed are molded parts derived from the composition.

12 Claims, No Drawings

THERMOPLASTIC MELT-MIXED COMPOSITION WITH POLYETHEROL HEAT STABILIZER

CROSS REFERENCE TO RELATED APPLICATIONS

This application claims priority to U.S. Provisional Application No. 61/659,005, filed Jun. 13, 2012.

FIELD OF INVENTION

The present invention relates to the field of polyamide compositions having improved long-term high temperature aging characteristics.

BACKGROUND OF INVENTION

High temperature resins based on polyamides possess desirable chemical resistance, processability and heat resistance. This makes them particularly well suited for demanding high performance automotive and electrical/electronics applications. There is a current and general desire in the automotive field to have high temperature resistant structures since temperatures higher than 150° C., even higher than 200° C., are often reached in under-hood areas of automobiles. When plastic parts are exposed to such high temperatures for a prolonged period, such as in automotive under-the-hood applications or in electrical/electronics applications, the mechanical properties generally tend to decrease due to the thermo-oxidation of the polymer. This phenomenon is called heat aging.

In an attempt to improve heat aging characteristics, polyhydric alcohols have been found to give significantly improved heat aging characteristics as disclosed in US patent application publication US 2010-0029819 A1 (Palmer et al). However, molded articles derived from the polyamide compositions comprising the polyhydric alcohols have a tendency to undergo surface whitening upon aging at high humidity; which is an undesirable feature for many applications.

There remains a need for thermoplastic compositions that are suitable for manufacturing articles, that exhibit good mechanical properties after long-term high temperature exposure; and have desirable visual properties; that is, exhibit no whitening or a low degree of whitening, upon aging at high humidity.

EP 1041109 discloses a polyamide composition comprising a polyamide resin, a polyhydric alcohol having a melting point of 150 to 280° C., that has good fluidity and mechanical strength and is useful in injection welding techniques.

US Patent Application Publication US 2011/0020651 discloses a thermoplastic polyamide resin including the essential components of polyamide resin, polyalcohol and epoxy resin.

U.S. Pat. No. 5,605,945 discloses a polyamide molding composition with increased viscosity, high thermal stability and favorable mechanical properties comprising a polyamide resin and a diepoxide.

US Patent Application Publication 2012/0010343 discloses a thermoplastic molding composition comprising a polyamide and high-functionality polyetherol.

U.S. Pat. No. 2,462,047 discloses a polyamide resin including a polyetherol condensate.

SUMMARY

Disclosed is a thermoplastic melt-mixed composition comprising:
a) a polyamide resin;
b) 1 to 10 weight percent of a polyetherol compound provided by reacting:
  b1) 10 to 90 weight percent of one or more polyepoxy compound having at least two or more epoxy groups; the polyepoxy compound having a epoxide equivalent weight of 43 to 1000 g/equivalent as determined by calculation, or if an oligomer is used, by titration using ASTM D1652-11 method; and
  b2) 90 to 10 weight percent one or more polyhydric alcohols having two or more hydroxyl groups and a having hydroxyl equivalent weight of 30 to 1000 g/equivalent as determined by hydroxyl number calculation, or if an oligomer is used by determination of the hydroxyl number according to ASTM E 1899-08, wherein the weight percent of b1) and b2) is based on the total weight of b1) and b2);
said polyetherol compound having a range of at least 10 percent conversion of epoxy equivalents of component (b1) up to, but excluding, the gel point of the components b1) and b2), as determined with 1H NMR analysis of the polyetherol; and a number average molecular weight (Mn) of at least 200 to about 10,000 as determined with size exclusion chromatography;
c) 10 to 60 weight percent of reinforcing agent;
d) 0 to 30 weight percent polymeric toughener; and
e) 0 to 10 weight percent further additives;
wherein all weight percentages are based on the total weight of the polyamide composition.

Also disclosed are processes for preparing the composition disclosed above and molded and extruded articles made from the compositions.

DETAILED DESCRIPTION

Herein melting points and glass transitions are as determined with differential scanning calorimetry (DSC) at a scan rate of 10° C./min in the first heating scan, wherein the melting point is taken at the maximum of the endothermic peak and the glass transition, if evident, is considered the mid-point of the change in enthalpy.

For the purposes of the description, unless otherwise specified, "high-temperature" means a temperature at or higher than 170° C., preferably at or higher than 210° C., and most preferably at or higher than 230° C.

In the present invention, unless otherwise specified, "long-term" refers to an aging period equal or longer than 500 hrs.

As used herein, the term "high heat stability", as applied to the polyamide composition disclosed herein or to an article made from the composition, refers to the retention of physical properties (for instance, tensile strength) of 2 mm thick molded test bars consisting of the polyamide composition that are exposed to air oven aging (AOA) conditions at a test temperature at 210° C. or 230° C. for a test period of at least 500 h, in an atmosphere of air, and then tested according to ISO 527-2/1BA method. The physical properties of the test bars are compared to that of unexposed controls that have identical composition and shape, and are expressed in terms of "% retention". In a preferred embodiment the test temperature is at 230° C., the test period is at 1000 hours and the exposed test bars have a % retention of tensile strength of at least 50%. Herein "high heat stability" means that said molded test bars, on average, meet or exceed a retention for tensile strength of 50% when exposed at a test temperature at 210° C. for a test period of at least 500 h. Compositions exhibiting a higher retention of physical properties for a given exposure temperature and time period have better heat stability.

The terms "at 170° C.," "at 210° C." and "at 230° C." refer to the nominal temperature of the environment to which the test bars are exposed; with the understanding that the actual temperature may vary by +/−2° C. from the nominal test temperature.

One embodiment of the invention is a thermoplastic melt mixed composition comprising:
  a) a polyamide resin, preferably a semicrystalline polyamide having a melting point;
  b) 1 to 10 weight percent of a polyetherol compound provided by reacting:
    b1) 10 to 90 weight percent of one or more polyepoxy compound having at least two or more epoxy groups; the polyepoxy compound having a epoxide equivalent weight of 43 to 1000 g/equivalent as determined by calculation, or if an oligomer is used, by titration using ASTM D1652-11 method; and
    b2) 90 to 10 weight percent one or more polyhydric alcohols having two or more hydroxyl groups and a having hydroxyl equivalent weight of 30 to 1000 g/equivalent as determined by hydroxyl number calculation, or if an oligomer is used by determination of the hydroxyl number according to ASTM E 1899-08, wherein the weight percent of b1) and b2) is based on the total weight of b1) and b2);
    said polyetherol compound having a range of at least 10 percent conversion of epoxy equivalents of component (b1) up to, but excluding, the gel point of the components b1) and b2); as determined with 1H NMR analysis of the polyetherol; and a number average molecular weight (Mn) of at least 200 to about 10,000 as determined with size exclusion chromatography;
  c) 10 to 60 weight percent of reinforcing agent;
  d) 0 to 30 weight percent polymeric toughener, and
  e) 0 to 10 weight percent further additives;
wherein all weight percentages are based on the total weight of the polyamide composition.

The thermoplastic polyamide compositions of various embodiments of the invention comprise a polyamide resin. The polyamide resins are condensation products of one or more dicarboxylic acids and one or more diamines, and/or one or more aminocarboxylic acids, and/or ring-opening polymerization products of one or more cyclic lactams. Suitable cyclic lactams are caprolactam and laurolactam. Polyamides may be fully aliphatic or semi-aromatic.

Fully aliphatic polyamides are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to copolymers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic carboxylic acids, such as for example adipic acid (C6), pimelic acid (C7), suberic acid (C8), azelaic acid (C9), decanedioic acid (C10), dodecanedioic acid (C12), tridecanedioic acid (C13), tetradecanedioic acid (C14), pentadecanedioic acid (C15), hexadecanedioic acid (C16) and octadecanedioic acid (C18).

Diamines can be chosen among diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

The semi-aromatic polyamide is a homopolymer, a copolymer, a terpolymer or more advanced polymers formed from monomers containing aromatic groups. One or more aromatic carboxylic acids may be terephthalate or a mixture of terephthalate with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids, as disclosed above. Alternatively, an aromatic diamine such as meta-xylylene diamine (MXD) can be used to provide a semi-aromatic polyamide, an example of which is MXD6, a homopolymer comprising MXD and adipic acid.

Preferred polyamides disclosed herein are homopolymers or copolymers wherein the term copolymer refers to polyamides that have two or more amide and/or diamide molecular repeat units. The homopolymers and copolymers are identified by their respective repeat units. For copolymers disclosed herein, the repeat units are listed in decreasing order of mole % repeat units present in the copolymer. The following list exemplifies the abbreviations used to identify monomers and repeat units in the homopolymer and copolymer polyamides (PA):

HMD hexamethylene diamine (or 6 when used in combination with a diacid)
T Terephthalic acid
AA Adipic acid
DMD Decamethylenediamine
6 $\epsilon$ -Caprolactam
DDA Decanedioic acid
DDDA Dodecanedioic acid
TDDA Tetradecanedioic acid
HDDA Hexadecanedioic acid
ODDA Octadecanedioic acid
I Isophthalic acid
MXD meta-xylylene diamine
TMD 1,4-tetramethylene diamine
4T polymer repeat unit formed from TMD and T
6T polymer repeat unit formed from HMD and T
DT polymer repeat unit formed from 2-MPMD and T
MXD6 polymer repeat unit formed from MXD and AA
66 polymer repeat unit formed from HMD and AA
10T polymer repeat unit formed from DMD and T
410 polymer repeat unit formed from TMD and DDA
510 polymer repeat unit formed from 1,5-pentanediamine and DDA
610 polymer repeat unit formed from HMD and DDA
612 polymer repeat unit formed from HMD and DDDA
614 polymer repeat unit formed from HMO and TDDA
616 polymer repeat unit formed from HMD and HDDA
618 polymer repeat unit formed from HMD and ODDA
6 polymer repeat unit formed from $\epsilon$-caprolactam
11 polymer repeat unit formed from 11-aminoundecanoic acid
12 polymer repeat unit formed from 12-aminododecanoic acid Note that in the art the term "6" when used alone designates a polymer repeat unit formed from $\epsilon$-caprolactam. Alternatively "6" when used in combination with a diacid such as T, for instance 6T, the "6" refers to HMD. In repeat units comprising a diamine and diacid, the diamine is designated first.

Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

In one embodiment the polyamide composition comprises a one or more polyamides selected from the group consisting of Group (I) polyamides having a melting point of less than 210° C., and comprising an aliphatic or semiaromatic polyamide selected from the group consisting of poly(pentamethylene decanediamide) (PA510), poly(pentamethylene dodecanediamide) (PA512), poly($\epsilon$-caprolactam/hexamethylene hexanediamide) (PA6/66), poly($\epsilon$-caprolactam/hexamethylene decanediamide) (PA6/610), poly($\epsilon$-caprolactam/hexamethylene dodecanediamide) (PA6/612), poly(hexamethylene tridecanediamide) (PA613), poly(hexamethylene pentadecanediamide) (PA615), poly($\epsilon$-caprolactam/tetramethylene terephthalamide) (PA6/4T), poly($\epsilon$-caprolactam/hexamethylene terephthalamide) (PA6/6T), poly($\epsilon$-caprolactam/decamethylene terephthalamide) (PA6/10T), poly-caprolactam/dodecamethylene terephthalamide) (PA6/12T), poly(hexamethylene decanediamide/hexamethylene terephthalamide) (PA610/6T), poly(hexamethylene dodecanediamide/hexamethylene terephthalamide) (PA612/6T), poly(hexamethylene tetradecanediamide/hexamethylene terephthalamide) (PA614/6T), poly($\epsilon$-caprolactam/hexamethylene isophthalamide/hexamethylene terephthalamide) (PA6/6I/6T), poly($\epsilon$-caprolactam/hexamethylene hexanediamide/hexamethylene decanediamide) (PA6/66/610), poly($\epsilon$-caprolactam/hexamethylene hexanediamide/hexamethylene dodecanediamide) (PA6/66/612), poly($\epsilon$-caprolactam/hexamethylene hexanediamide/hexamethylene decanediamide/hexamethylene dodecanediamide) (PA6/66/610/612), poly(2-methylpentamethylene hexanediamide/hexamethylene hexanediamide/hexamethylene terephthamide) (PA D6/66/6T), poly(2-methylpentamethylene hexanediamide/hexamethylene hexanediamide/) (PA D6/66), poly(decamethylene decanediamide) (PA1010), poly(decamethylene dodecanediamide) (PA1012), poly(decamethylene decanediamide/decamethylene terephthalamide) (PA1010/10T) poly(decamethylene decanediamide/dodecamethylene decanediamide/decamethylene terephthalamide/dodecamethylene terephthalamide (PA1010/1210/10T/12T), poly(11-aminoundecanamide) (PA11), poly(11-aminoundecanamide/tetramethylene terephthalamide) (PA11/4T), poly(11-aminoundecanamide/hexamethylene terephthalamide) (PA11/6T), poly(11-aminoundecanamide/decamethylene terephthalamide) (PA11/10T), poly(11-aminoundecanamide/dodecamethylene terephthalamide) (PA11/12T), poly(12-aminododecanamide) (PA12), poly(12-aminododecanamide/tetramethylene terephthalamide) (PA12/4T), poly(12-aminododecanamide/hexamethylene terephthalamide) (PA12/6T), poly(12-aminododecanamide/decamethylene terephthalamide) (PA12/10T) poly(dodecamethylene dodecanediamide) (PA1212), poly(dodecamethylene dodecanediamide/dodecamethylene terephthalamide)) (PA1212/12T), poly(hexamethylene hexadecanediamide) (PA616), and poly(hexamethylene octadecanediamide) (PA618);

Group (II) polyamides having a melting point of at least 210° C., and comprising an aliphatic polyamide selected from the group consisting of poly(tetramethylene hexanediamide) (PA46), poly($\epsilon$-caprolactam) (PA 6), poly(hexamethylene hexanediamide/($\epsilon$-caprolactam/) (PA 66/6) poly(hexamethylene hexanediamide) (PA 66), poly(hexamethylene hexanediamide/hexamethylene decanediamide) (PA66/610), poly(hexamethylene hexanediamide/hexamethylene dodecanediamide) (PA66/612), poly(hexamethylene hexanediamide/decamethylene decanediamide) (PA66/1010), poly(hexamethylene decanediamide) (PA610), poly(hexamethylene dodecanediamide) (PA612), poly(hexamethylene tetradecanediamide) (PA614), and poly(tetramethylene hexanediamide/2-methylpentamethylene hexanediamide) (PA46/D6); wherein within Group (II) Polyamides are Group (IIA) Polyamides having a melting point of at least 210° C. and less than 230° C. and Group (IIB) Polyamides having a melting point of 230° C. or greater;

Group (III) polyamides having a melting point of at least 230° C., and comprising
  (aa) about 20 to about 35 mole percent semiaromatic repeat units derived from monomers selected from one or more of the group consisting of:
    (i) aromatic dicarboxylic acids having 8 to 20 carbon atoms and aliphatic diamines having 4 to 20 carbon atoms; and
  (bb) about 65 to about 80 mole percent aliphatic repeat units derived from monomers selected from one or more of the group consisting of:
    (ii) an aliphatic dicarboxylic acid having 6 to 20 carbon atoms and said aliphatic diamine having 4 to 20 carbon atoms; and
    (iii) a lactam and/or aminocarboxylic acid having 4 to 20 carbon atoms;

Group (IV) polyamides comprising
  (cc) about 50 to about 95 mole percent semiaromatic repeat units derived from monomers selected from one or more of the group consisting of:
    (i) aromatic dicarboxylic acids having 8 to 20 carbon atoms and aliphatic diamines having 4 to 20 carbon atoms; and
  (dd) about 5 to about 50 mole percent aliphatic repeat units derived from monomers selected from one or more of the group consisting of:
    (ii) an aliphatic dicarboxylic acid having 6 to 20 carbon atoms and said aliphatic diamine having 4 to 20 carbon atoms; and
    (iii) a lactam and/or aminocarboxylic add having 4 to 20 carbon atoms;

Group (V) polyamides having a melting point of at least 260° C., comprising
  (ee) greater than 95 mole percent semiaromatic repeat units derived from monomers selected from one or more of the group consisting of:
    (i) aromatic dicarboxylic adds having 8 to 20 carbon atoms and aliphatic diamines having 4 to 20 carbon atoms; and
  (ff) less than 5 mole percent aliphatic repeat units derived from monomers selected from one or more of the group consisting of:
    (ii) an aliphatic dicarboxylic add having 6 to 20 carbon atoms and said aliphatic diamine having 4 to 20 carbon atoms;
    (iii) a lactam and/or aminocarboxylic add having 4 to 20 carbon atoms; and Group (VI) polyamides having no melting point, and selected from the group consisting of poly(hexamethylene isophthalamide/hexamethylene terephthalamide) (6I/6T) and poly(hexamethylene isophthalamide/hexamethylene terephthalamide/hexamethylene hexanediamide) (6I/6T/66).

Group (I) polyamides may have semiaromatic repeat units to the extent that the melting point is less than 210° C. and generally the semiaromatic polyamides of the group have less than 40 mole percent semiaromatic repeat units. Semiaromatic repeat units are defined as those derived from monomers selected from one or more of the group consisting of: aromatic dicarboxylic adds having 8 to 20 carbon atoms and aliphatic diamines having 4 to 20 carbon atoms.

Another embodiment is a molded or extruded thermoplastic article wherein said polyamide resin is selected from Group (III) polyamides selected from the group consisting of poly(tetramethylene hexanediamide/tetramethylene terephthalamide) (PA46/4T), poly(tetramethylene hexanediamide/hexamethylene terephthalamide) (PA46/6T), poly(tetramethylene hexanediamide/2-methylpentamethylene hexanediamide/decamethylene terephthalamide) PA46/D6/10T), poly(hexamethylene hexanediamide/hexamethylene terephthalamide) (PA66/6T), poly(hexamethylene hexanediamide/hexamethylene isophthalamide/hexamethylene terephthalamide PA66/6I/6T, and poly(hexamethylene hexanediamide/2-methylpentamethylene hexanediamide/hexamethylene terephthalamide (PA66/D6/6T); and a most preferred Group (III) polyamide is PA 66/6T.

Another embodiment is a molded or extruded thermoplastic article wherein said polyamide resin is selected from Group (IV) polyamides selected from the group consisting of poly(tetramethylene terephthalamide/hexamethylene hexanediamide) (PA4T/66), poly(tetramethylene terephthalamide/ε-caprolactam) (PA4T/6), poly(tetramethylene terephthalamide/hexamethylene dodecanediamide) (PA4T/612), poly(tetramethylene terephthalamide/2-methylpentamethylene hexanediamide/hexamethylene hexanediamide) (PA4T/D6/66), poly(hexamethylene terephthalamide/2-methylpentamethylene terephthalamide/hexamethylene hexanediamide) (PA6T/DT/66), poly(hexamethylene terephthalamide/hexamethylene hexanediamide) PA6T/66, poly(hexamethylene terephthalamide/hexamethylene decanediamide) (PA6T/610), poly(hexamethylene terephthalamide/hexamethylene tetradecanediamide) (PA6T/614), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PAST/11), poly(nonamethylene terephthalamide/12-aminododecanamide) (PA9I712), poly(decamethylene terephthalamide/11-aminoundecanamide) (PA 10T/11), poly(decamethylene terephthalamide/12-aminododecanamide) (PA10T/12) poly(decamethylene terephthalamide/decamethylene decanediamide) (PA10T/1010), poly(decamethylene terephthalamide/decamethylene dodecanediamide) (PA10T/1012), poly(decamethylene terephthalamide/tetramethylene hexanediamide) (PA10T/46), poly(decamethylene terephthalamide/ε-caprolactam) (PA10T/6), poly(decamethylene terephthalamide/hexamethylene hexanediamide) (PA10T/66), poly(dodecamethylene terephthalamide/dodecamethylene dodecanediamide) (PA12T/1212), poly(dodecamethylene terephthalamide/ε-caprolactam) (PA12T/6), and poly(dodecamethylene terephthalamide/hexamethylene hexanediamide) (PA12T/66); and a most preferred Group (IV) polyamide is PA6T/66.

Another embodiment is a molded or extruded thermoplastic article wherein said polyamide resin is selected from Group (V) polyamides selected from the group consisting of poly(tetramethylene terephthalamide/2-methylpentamethylene terephthalamide) PA4T/DT, poly(tetramethylene terephthalamide/hexamethylene terephthalamide) PA4T/6T, poly(tetramethylene terephthalamide/decamethylene terephthalamide) PA4T/10T, poly(tetramethylene terephthalamide/dodecamethylene terephthalamide) PA4T/12T, poly(tetramethylene terephthalamide/2-methylpentamethylene terephthalamide/hexamethylene terephthalamide) (PA4T/DT/6T), poly(tetramethylene terephthalamide/hexamethylene terephthalamide/2-methylpentamethylene terephthalamide) (PA4T/6T/DT), poly(hexamethylene terephthalamide/2-methylpentamethylene terephthalamide) (PA6T/DT), poly(hexamethylene hexanediamide/hexamethylene isophthalamide) (PA 6T/6I), poly(hexamethylene terephthalamide/decamethylene terephthalamide) PA6T/10T, poly(hexamethylene terephthalamide/dodecamethylene terephthalamide) (PA6T/12T), poly(hexamethylene terephthalamide/2-methylpentamethylene terephthalamide/poly(decamethylene terephthalamide) (PA6T/DT/10T), poly(hexamethylene terephthalamide/decamethylene terephthalamide/dodecamethylene terephthalamide) (PA6T/10T/12T), poly(decamethylene terephthalamide) (PA10T), poly(decamethylene terephthalamide/tetramethylene terephthalamide) (PA10T/4T), poly(decamethylene terephthalamide/2-methylpentamethylene terephthalamide) (PA10T/DT), poly(decamethylene terephthalamide/dodecamethylene terephthalamide) (PA10T/12T), poly(decamethylene terephthalamide/2-methylpentamethylene terephthalamide/(decamethylene terephthalamide) (PA10T/DT/12T), poly(dodecamethylene terephthalamide) (PA12T), poly(dodecamethylene terephthalamide)/tetramethylene terephthalamide) (PA12T/4T), poly(dodecamethylene terephthalamide)/hexamethylene terephthalamide) PA12T/6T, poly(dodecamethylene terephthalamide)/decamethylene terephthalamide) (PA12T/10T), and poly(dodecamethylene terephthalamide)/2-methylpentamethylene terephthalamide) (PA12T/DT); and a most preferred Group (V) Polyamide is PA6T/DT.

In various embodiments the polyamide is a Group (I) Polyamide, Group (II) Polyamide, Group (III) Polyamide, Group (IV) Polyamide, Group (V) Polyamide or Group (VI) Polyamide, respectively.

The polyamides may also be blends of two or more polyamides. Preferred blends include those selected from the group consisting of Group (I) and Group (II) Polyamides; Group (I) and Group (III) Polyamide, Group (I) and Group (VI) Polyamides, Group (II) and Group (III) Polyamides, Group (II) and Group (IV) Polyamides, Group (II) and Group (V) Polyamides, Group (II) and Group (VI) Polyamides, Group (III) and Group (VI) Polyamides, and Group (IV) and Group (V) Polyamides.

A preferred blend includes Group (II) and (V) Polyamides, and a specific preferred blend includes poly(hexamethylene hexanediamide) (PA 66) and poly(hexamethylene terephthalamide/2-methylpentamethylene terephthalamide) (PA 6T/DT).

Another preferred blend includes Group (II) and Group (III) Polyamides and a specific preferred blend includes poly (ε-caprolactam) (PA6) and poly(hexamethylene hexanediamide/hexamethylene terephthalamide (PA66/6T).

In various embodiments 29 to 89, 49 to 89, or 55 to 89 weight percent of polyamide resin is present in the thermoplastic polyamide composition.

Polyetherol Compound

The thermoplastic melt-mixed composition comprises a polyetherol compound provided by reacting:

(b1) 10 to 90 weight percent, and preferably 25 to 75 weight percent or 30 to 70 weight percent, of one or more polyepoxy compound having at least two or more epoxy groups, the polyepoxy compound having a epoxide equivalent weight of 70 to 1000 g/equivalent as determined by calculation, or if an oligomer is used, by titration using ASTM D1652-11 method; and (b2) 90 to 10 weight percent, and preferably 75 to 25 weight percent or 70 to 30 weight percent, of one or more polyhydric alcohols having two or more hydroxyl groups and a having hydroxyl equivalent weight of 30 to 1000 g/equivalent as determined by hydroxyl number calculation, or if an oligomer is used by determination of the hydroxyl number according to ASTM E 1899-08, wherein the weight percent of b1) and b2) is based on the total weight of a) and b).

Polyepoxy compound (b1) useful in forming the polyetherol (b) has at least two or more epoxy groups; and the polyepoxy compound has a epoxide equivalent weight of 43 to 1000 g/equivalent, preferably 70 to 1000 g/equivalent or 80 to 500 g/equivalent, as determined by calculation using the number of epoxy groups per molecule and the molecular weight, or if an oligomer is used by determining the equivalent weight by titration using ASTM D1652-11 method. In one embodiment the polyepoxy compound (b1) has a number average molecular weight in the range of about 140 to 5000 or 180 to about 2000.

Examples of the polyepoxy compounds useful in providing the polyetherol include 1,4-butanediol diglycidyl ether (BDE), bisphenol A diglycidyl ether (BADGE), bisphenol F diglycidyl ether (BFDE), trimethylolpropane triglycidyl ether (TTE), hydrogenated bisphenol A type epoxy resin, brominated epoxy resin, cycloaliphatic epoxy resin, glycidyl amine type epoxy resin. Further examples of polyepoxides which can be used in the present invention include polyepoxides made by epoxidation of polyenes such as 1,3-butadiene diepoxide (MW 86.09, epoxy equivalent weight=43.05), 1,2,7,8-diepoxyoctane, 1,2,5,6-diepoxycyclooctane, 4-vinyl-1-cyclohexene diepoxide, and epoxidized polyisoprene copolymers such as commercial resins available from Shell Chemical Company, e.g., EKP 206 and EKP 207 (MW 6,000, epoxy equivalent weight 670). Other useful polyepoxides are the EPON™ Resins, derived from a liquid epoxy resin and bisphenol-A, available from Momentive, Inc., Columbus, Ohio. The epoxy resin is not limited to these, and these may be used singly or in a combination of two or more kinds.

Polyhydric Alcohols

The polyhydric alcohols have two or more hydroxyl groups and a have a hydroxyl equivalent weight of 30 to 1000 g/equivalent, and preferably 80 to 500 g/equivalent, as determined by calculation, or if an oligomer is used, by hydroxyl number determination according to ASTM E 1899-08.

Polyhydric alcohols include those selected from the group consisting of polyhydroxy polymers having a number average molecular weight ($M_n$) of more than 2000, as determined with size exclusion chromatography (SEC) and polyhydric alcohols having a $M_n$ of less than 2000 by molecular weight calculation or, for oligomeric polyhydric alcohols, as determined with (SEC).

Polyhydroxy polymers include those selected from the group consisting of ethylene/vinyl alcohol copolymers and polyvinyl alcohol). Preferably the polyhydroxy polymer has a $M_n$ of 5,000 to 50,000. In one embodiment the polyhydroxy polymer is an ethylene/vinyl alcohol copolymer (EVOH). The EVOH may have a vinyl alcohol repeat content of 10 to 90 mol % and preferably 30 to 80 mol %, 40 to 75 mol %, 50 to 75 mol %, and 50 to 60 mol %, wherein the remainder mol % is ethylene. A suitable EVOH for the thermoplastic composition is Soarnol® A or D copolymer available from Nippon Gosei (Tokyo, Japan) and EVAL® copolymers available from Kuraray, Tokyo, Japan.

In one embodiment the polyhydroxy polymer is a polyvinyl alcohol) polymer (PVOH). Suitable PVOH polymers for the thermoplastic composition are the Mowiol® brand resins available from Kuraray Europe Gmbh.

Polyhydric alcohols having a number average molecular weight ($M_n$) of less than 2000, include aliphatic hydroxylic compounds containing more than two hydroxyl groups, aliphatic-cycloaliphatic compounds containing more than two hydroxyl groups, cycloaliphatic compounds containing more than two hydroxyl groups, and saccharides and polysaccharides. Preferably the polyhydric alcohol has three or more hydroxyl groups. In a preferred embodiment the polyhydric alcohol has three to six hydroxyl groups.

An aliphatic chain in the polyhydric alcohol can include not only carbon atoms but also one or more hetero atoms which may be selected, for example, from nitrogen, oxygen and sulphur atoms. A cycloaliphatic ring present in the polyhydric alcohol can be monocyclic or part of a bicyclic or polycyclic ring system and may be carbocyclic or heterocyclic. A heterocyclic ring present in the polyhydric alcohol can be monocyclic or part of a bicyclic or polycyclic ring system and may include one or more hetero atoms which may be selected, for example, from nitrogen, oxygen and sulphur atoms. The one or more polyhydric alcohols may contain one or more substituents, such as ether, carboxylic acid, carboxylic acid amide or carboxylic acid ester groups.

Examples of polyhydric alcohol containing more than two hydroxyl groups include, without limitation, triols, such as glycerol, trimethylolpropane, 2,3-di-(2'-hydroxyethyl)-cyclohexan-1-ol, hexane-1,2,6-triol, 1,1,1-tris-(hydroxymethyl)ethane, 3-(2'-hydroxyethoxy)-propane-1,2-diol, 3-(2'-hydroxypropoxy)-propane-1,2-diol, 2-(2'-hydroxyethoxy)-hexane-1,2-diol, 6-(2'-hydroxypropoxy)-hexane-1,2-diol, 1,1,1-tris-[(2'-hydroxyethoxy)-methyl]-ethane, 1,1,1-tris-[(2'-hydroxypropoxy)-methyl]-propane, 1,1,1-tris-(4'-hydroxyphenyl)-ethane, 1,1,1-tris-(hydroxyphenyl)-propane, 1,1,3-tris-(dihydroxy-3-methylphenyl)-propane, 1,1,4-tris-(dihydroxyphenyl)-butane, 1,1,5-tris-(hydroxyphenyl)-3-methylpentane, trimethylolpropane ethoxylates, or trimethylolpropane propoxylates; polyols such as pentaerythritol, dipentaerythritol, di-trimethylolpropane, and tripentaerythritol; oligomers including diglycerol, triglycerol, tetraglycerol, pentaglycerol, hexaglycerol, heptaglycerol, octaglycerol, nonaglycerol, decaglycerol; and saccharides, such as cyclodextrin, D-mannose, glucose, galactose, sucrose, fructose, xylose, arabinose, D-mannitol, D-sorbitol, D- or L-arabitol, xylitol, iditol, talitol, allitol, altritol, guilitol, erythritol, threitol, and D-gulonic-y-lactone; and the like.

Preferred polyhydric alcohols include those having a pair of hydroxyl groups which are attached to respective carbon atoms which are separated one from another by at least one atom. In one embodiment the polyhydric alcohol does not include an amine functionality in the form of primary, secondary or tertiary amine. Especially preferred polyhydric alcohols are those in which a pair of hydroxyl groups is attached to respective carbon atoms which are separated one from another by a single carbon atom.

Preferably, the polyhydric alcohol used in providing the polyetherol is selected from the group of glycerol (GLY), pentaerythritol (PE), dipentaerythritol (DPE), tripentaerythritol (TPE), di-trimethylolpropane (DTP), trimethylolpropane (TMP), 1,1,1-tris(hydroxymethyl)propane (THE) and mixtures of these.

By "reacting" means providing conditions such that one or more alcohol functionality of the polyol reacts with one or more epoxy group of the polyepoxy compound to form an ether (C—O—C) linkage via ring-opening of the epoxy functionality. The ring-opening reaction also provides an equivalent of hydroxyl group, and thus, the reaction provides a polyetherol. The reacting may be accomplished by mixing and heating a combination of polyepoxy and polyol to a reaction temperature for a reaction period to provide a desired percent conversion of the polyepoxy to polyetherol linkages. The percent conversion of the polyepoxy compound is determined by measuring the $^1$H NMR signal of one of the epoxy ring hydrogen diastereomers versus a second internal standard signal that does not change during the reaction, as further disclosed in the Methods.

Suitable reaction temperatures include the range of 23° C. to 250° C. Suitable reaction periods include the range of 2 minutes to about 24 hours. As desired by the artisan, the reaction may be performed: under a range of pressure, for instance 2 atmospheres to about 0.01 mm Hg; in the presence or absence of a catalysis, e.g. acid catalysis or base catalysis; and in the presence or absence of a solvent; in the presence or absence of a plasticizer, or other additive that may be ultimately found desirable in the thermoplastic melt-mixed composition. In one embodiment the reaction is performed in the absence of a catalyst.

Reacting the combination of the polyepoxy compound b1) and the polyhydric alcohol (b2) provides a polyetherol compound having a range of at least 10 percent conversion of epoxy equivalents of component b1) up to, but excluding, the gel point of the components b1) and b2); and a number average molecular weight ($M_n$) of at least 200 to about 10000 as determined with size exclusion chromatography. In various embodiments the polyetherol compound has a $M_n$ of 400 to about 8000 and 800 to about 8000. In various embodiments the polyetherol compound has preferred ranges of at least 25 percent conversion, 40 percent conversion, 50 percent conversion, 80 percent conversion and 85 percent conversion, of epoxy equivalents of component b1) up to, but excluding, the gel point of the components b1) and b2).

Various embodiments include many combinations of polyepoxy compound b1) and polyhydric alcohol b2) that provide a polyetherol that can be taken to 100% epoxy conversion without providing a gel point.

The upper limit of the extent of reaction of polyepoxy compound b1) and polyhydric alcohol b2) to provide a useful polyetherol is just below the gel point. The gel point is the point wherein the material is crosslinked and can no longer flow and be melt-blended to provide a uniform blend. The gel point can be calculated using a modified Crouthers equation (G. Odian, Principles of Polymerization, 1981, ISBN 0-471-05146-2, John Wiley & Sons, Inc., p. 117-119) which is a statistical equation for nonequivalent (nonstoichiometric) reactant mixtures for 2 reagents, having at least 2 reactive groups A and B per molecule and at least one having more than 2 groups per molecule:

$$pc = 1/\{r[1+(fA-2)][1+(fB-2)]\}\exp^{1/2}$$  Eq. (I)

where:
pc=conversion of group A at gel point, conversion of group B is r×pc
r=1 or <1, ratio of A to B groups
f>2 is a functionality of the reagent with functionality >2.

Examples of gel points (G-1-G-6), calculated using Eq (I) for various combinations of reagent functionality are listed in Table A.

TABLE A

| Gel point examples | G1 | G2 | G3 | G4 | G5 | G6 |
|---|---|---|---|---|---|---|
| Reagent A (polyepoxy) functionality (fA) | 4 | 4 | 6 | 6 | 4 | 6 |
| Reagent B (polyhydric alcohol) functionality (fB) | 2 | 2 | 2 | 2 | 4 | 6 |
| Molar ratio of A to B reagents | 0.5 | 0.25 | 0.33 | 0.083 | 1 | 0.5 |
| Molar (or equivalent) ratio of A to B groups (r) | 1 | 0.5 | 1 | 0.5 | 1 | 0.5 |
| Gel Point (pc for conversion of group A, from Eq. 1) | 0.577 | 0.816 | 0.447 | 0.894 | 0.333 | 0.283 |

In various embodiments the polyetherol is present in the thermoplastic melt-mixed composition at 1.0 to 10 weight percent, 2 to 8 weight percent, 2 to 6 weight percent and 3 to 6 weight percent of the thermoplastic melt-mixed composition. In one embodiment the polyetherol has a hydroxyl equivalent weight of at least 50 to about 18,000, and preferably about 50 to 1000, 50 to 500, 60 to 400, 60 to 300 and 60 to about 100, as calculated using the total weight of polyepoxy+polyol divided by total moles of hydroxyl group within the polyol portion. The hydroxy equivalent weight of polyetherols derived from polyol oligomers may be determined by titration according to ASTM E 1899-08.

In preferred embodiments the polyetherol is the reaction product of polyepoxys selected from the group consisting of 1,4-butanediol diglycidyl ether (BDE), bisphenol A diglycidyl ether (BADGE), bisphenol F diglycidyl ether (BFDE), trimethylolpropane triglycidyl ether (TTE), and mixtures of these; and polyols selected from the group consisting of dipentaerythritol (DPE) 1,1,1-tris(hydroxymethyl)propane (THP), di(trimethylol)propane (DTP), 1,1,1-tris(hydroxymethyl)ethane (THE), glycerol (GLY), and mixtures of these.

Reinforcing Agent

The thermoplastic polyamide composition comprises 10 to about 60 weight percent, and preferably about 12.5 to 55 weight percent and 15 to 50 weight percent, of one or more reinforcement agents. The reinforcement agent may be any filler, but is preferably selected from the group consisting calcium carbonate, glass fibers with circular and noncircular cross-section, glass flakes, glass beads, carbon fibers, talc, mica, wollastonite, calcined clay, kaolin, diatomite, magnesium sulfate, magnesium silicate, barium sulfate, titanium dioxide, sodium aluminum carbonate, barium ferrite, potassium titanate and mixtures thereof. In preferred embodiments the reinforcing agent is selected from the group consisting of glass fiber having a circular cross-section and glass fiber with noncircular cross-section. The glass fiber may have sizing or coupling agents, organic or inorganic materials that improve the bonding between glass and the polyamide resin.

Glass fibers with noncircular cross-section refer to glass fiber having a cross section having a major axis lying perpendicular to a longitudinal direction of the glass fiber and corresponding to the longest linear distance in the cross section. The non-circular cross section has a minor axis corresponding to the longest linear distance in the cross section in a direction perpendicular to the major axis. The non-circular cross section of the fiber may have a variety of shapes including a cocoon-type (figure-eight) shape, a rectangular shape; an elliptical shape; a roughly triangular shape; a polygonal shape; and an oblong shape. As will be understood by those skilled in the art, the cross section may have other shapes. The ratio of the length of the major axis to that of the minor access is preferably between about 1.5:1 and about 6:1. The ratio is more preferably between about 2:1 and 5:1 and yet more preferably between about 3:1 to about 4:1. Suitable glass fiber are disclosed in EP 0 190 001 and EP 0 196 194.

The thermoplastic polyamide composition, optionally, comprises 0 to 30 weight percent of a polymeric toughener comprising a reactive functional group and/or a metal salt of a carboxylic acid. In one embodiment the composition comprises 2 to 20 weight percent polymeric toughener selected from the group consisting of: a copolymer of ethylene, glycidyl (meth)acrylate, and optionally one or more (meth)acrylate esters; an ethylene/α-olefin or ethylene/α-olefin/diene copolymer grafted with an unsaturated carboxylic anhydride; a copolymer of ethylene, 2-isocyanatoethyl (meth)acrylate, and optionally one or more (meth)acrylate esters; and a copolymer of ethylene and acrylic acid reacted with a Zn, Li, Mg or Mn compound to form the corresponding ionomer.

The thermoplastic composition of the present invention may also comprise 0 to 10 weight percent further additives commonly used in the art, such as further heat stabilizers or antioxidants referred to as "co-stabilizers", antistatic agents, blowing agents, plasticizers, lubricants and colorant and pigments. In one embodiment 0.02 to 0.5 weight percent of one or more lubricants is present. In another embodiment 0.1 to 3.0 weight percent of one or more colorants is present; wherein the weight percent colorant includes the weight of the carrier accompanying the colorant. In one embodiment the colorant is selected from the group of carbon black and nigrosine black pigment.

Co-stabilizers include copper stabilizers, secondary aryl amines, hindered amine light stabilizers (HALS), hindered phenols, and mixtures thereof, that are disclosed in US patent application publication 2010/0029819, Palmer et al, herein incorporated by reference.

Molded parts comprising the thermoplastic polyamide composition herein disclosed exhibit no whitening or only low levels of whitening upon ageing. For instance, molded parts, aged in an environmental chamber under conditions of 85% relative humidity and 85° C. for one to seven days show significantly less whitening than similar compositions absence the anti-whitening agents and lubricant. Although not met to be limiting the scope of the invention disclosed herein, whitening is thought to be related to the migration, (often referred to as blooming) and crystallization of materials onto the surface of test plaques under aging conditions. Whitening can be evaluated by visual observation and also by measuring the L value with a spectrophotometer. The L value is a common measure of whiteness on the CIELAB colorspace. Low L values correspond to darker plaques and higher L values correspond to lighter plaques. Therefore a positive ΔL means a change from darker to lighter. In one embodiment 5 in×3 in×3 mm test plaques prepared from the thermoplastic polyamide composition, when exposed at a test temperature at 85° C. and relative humidity of 85%, for a test period of 7 days in an atmosphere of air, had a ΔL value, versus an untreated control of identical composition, determined at 110° reflection with a multi-angle spectrophotometer, of at least 25 percent less than that of the same composition absent the anti-whitening agent.

Herein the thermoplastic composition is a mixture by melt-blending, in which all polymeric ingredients are adequately mixed, and all non-polymeric ingredients are adequately dispersed in a polymer matrix. Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing filler presents a long physical shape (for example, a long glass fiber), drawing extrusion molding may be used to prepare a reinforced composition.

Herein the thermoplastic composition is a mixture by melt-blending, in which all polymeric ingredients are adequately mixed, and all non-polymeric ingredients are adequately dispersed in a polymer matrix. Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing filler presents a long physical shape (for example, a long glass fiber), drawing extrusion molding may be used to prepare a reinforced composition.

Another embodiment is a process for providing a thermoplastic melt-mixed composition comprising:

A. melt-mixing:
  a) a polyamide resin;
  b) 1 to 10 weight percent of a polyetherol compound provided by reacting:
    b1) 10 to 90 weight percent of one or more polyepoxy compound having at least two or more epoxy groups; the polyepoxy compound having a epoxide equivalent weight of 70 to 1000 g/equivalent as determined by calculation, or if an oligomer is used, by titration using ASTM D1652-11 method; and
    b2) 90 to 10 weight percent one or more polyhydric alcohols having two or more hydroxyl groups and a having hydroxyl equivalent weight of 30 to 1000 g/equivalent as determined by hydroxyl number calculation, or if an oligomer is used by determination of the hydroxyl number according to ASTM E 1899-08, wherein the weight percent of a) and b) is based on the total weight of a) and b);
  said polyetherol compound having a range of at least 10 percent conversion of epoxy equivalents of component b1) up to, but excluding, the gel point of the components b1) and b2) as determined with $^1$H NMR analysis of the polyetherol; and a number average molecular weight ($M_n$) of at least 200 to about 10,000 as determined with size exclusion chromatography; 10 to 60 weight percent of reinforcing agent;
  c) 0 to 30 weight percent polymeric toughener; and
  d) 0 to 10 weight percent further additives;

B. extruding the thermoplastic melt-mixed composition in the form of laces or strands, C. cooling the laces or strands; and D. chopping or breaking the laces or strands into granules.

The melt-mixed compositions, as disclosed above, are useful in increasing long-term thermal stability at high temperatures of molded or extruded articles made therefrom. The long-term heat stability of the articles can be assessed by exposure (air oven ageing) of 2 mm thick test samples at various test temperatures in an oven for various test periods of time. The oven test temperatures for the compositions disclosed herein may be 170° C. and 500, 1000, or 2000 hours test periods; 210° C. and 500 or 1000 hours test periods; and 230° C. and 500 or 1000 hours test periods. The test samples, after air oven ageing, are tested for tensile strength and elongation to break, according to ISO 527-2/1 BA test method; and compared with unexposed controls having identical composition and shape, that are dry as molded (DAM). The comparison with the DAM controls provides the retention of tensile strength and/or retention of elongation to break, and thus the various compositions can be assessed as to long-term heat stability performance.

One embodiment is a molded or extruded thermoplastic article comprising the thermoplastic melt-mixed composition as disclosed in the above, wherein the polyamide resin comprises one or more Group (I) Polyamides, wherein 2 mm thick test bars, prepared from said melt-mixed composition and tested according to ISO 527-211 BA, and exposed at a test temperature of 170° C. for a test period of 500 hours, in an atmosphere of air, have on average, a retention of tensile strength of at least 40 percent, and preferably at least 50, 60, 70, 80, and 90% as compared with that of an unexposed control of identical composition and shape.

One embodiment is a molded or extruded thermoplastic article comprising the thermoplastic melt-mixed composition, as disclosed in the above embodiments, wherein the polyamide resin comprises one or more Group (II) Polyamides, wherein 2 mm thick test bars, prepared from said melt-mixed composition and tested according to ISO 527-2/1 BA, and exposed at a test temperature of 210° C. for a test period of 500 hours, in an atmosphere of air, have on average, a retention of tensile strength of at least 50 percent, and preferably at least 60, 70, 80, and 90%, as compared with that of an unexposed control of identical composition and shape.

One embodiment is a molded or extruded thermoplastic article comprising the thermoplastic melt-mixed composition, as disclosed in the above embodiments, wherein the polyamide resin comprises a one or more polyamides selected from the group consisting of Group (IIB) Polyamides, Group (III) Polyamides, Group (IV) Polyamides, Group (V) Polyamides, and Group (VI) Polyamides, wherein 2 mm thick test bars, prepared from said melt-mixed composition and tested according to ISO 527-2/1 BA, and exposed at a test temperature of 230° C. for a test period of 1000 hours, in an atmosphere of air, have on average, a retention of tensile strength of at least 40 percent, and preferably at least 50, 60, 70, 80, and 90%, as compared with that of an unexposed control of identical composition and shape.

In another aspect, the present invention relates to a method for manufacturing an article by shaping the thermoplastic polyamide composition disclosed herein. Examples of articles are films or laminates, automotive parts or engine parts or electrical/electronics parts. By "shaping", it is meant any shaping technique, such as for example extrusion, injection molding, thermoform molding, compression molding or blow molding. Preferably, the article is shaped by injection molding or blow molding.

The molded or extruded thermoplastic articles disclosed herein may have application in many vehicular components that meet one or more of the following requirements: high impact requirements; significant weight reduction (over conventional metals, for instance); resistance to high temperature; resistance to oil environment; resistance to chemical agents such as coolants; and noise reduction allowing more compact and integrated design, Specific molded or extruded thermoplastic articles are selected from the group consisting of charge air coolers (CAC); cylinder head covers (CHC); oil pans; engine cooling systems, including thermostat and heater housings and coolant pumps; exhaust systems including mufflers and housings for catalytic converters; air intake manifolds (AIM); and timing chain belt front covers. As an illustrative example of desired mechanical resistance against long-term high temperature exposure, a charge air cooler can be mentioned. A charge air cooler is a part of the radiator of a vehicle that improves engine combustion efficiency. Charge air coolers reduce the charge air temperature and increase the density of the air after compression in the turbocharger thus allowing more air to enter into the cylinders to improve engine efficiency. Since the temperature of the incoming air can be more than 200° C. when it enters the charge air cooler, it is required that this part be made out of a composition maintaining good mechanical properties under high temperatures for an extended period of time. Also it is very desirable to have a shaped article that exhibits no whitening or very little whitening upon aging.

The present invention is further illustrated by the following examples. It should be understood that the following examples are for illustration purposes only, and are not used to limit the present invention thereto.

Methods

Compounding Method

All Examples and Comparative Examples were prepared by melt blending the ingredients listed in the Tables in a 30 mm twin screw extruder (ZSK 30 by Coperion) operating at about 280° C. for Polyamide B and PA66 compositions and 310° C. barrel setting for Polyamide A (PA 6T/66 55:45) compositions, using a screw speed of about 300 rpm, a throughput of 13.6 kg/hour and a melt temperature measured by hand of about 320-355° C. for the all compositions. The glass fibers were added to the melt through a screw side feeder. Ingredient quantities shown in the Tables are given in weight percent on the basis of the total weight of the thermoplastic composition.

The compounded mixture was extruded in the form of laces or strands, cooled in a water bath, chopped into granules.

When the examples or comparative examples included liquid or oil ingredients (for instance TTE), Compounding Method 2 was used.

Compounding Method 2—a fraction (e.g. 500 g) of the polyamide was subjected to cryogenic grinding in a Bantam Micropulverizer to provide about 1 millimeter average particle size particles. The liquid or oil ingredients (for instance TTE), were blended into the ground particles to provide a uniform blend and the uniform blend added to the extruder.

Whitening Determination Method

Two 5 in×3 in plaques were treated by placing in an environmental chamber under conditions of 85% relative humidity and 85° C. After one day one plaque was removed from the chamber and visually inspected. The L value, determined at 110 reflection was measured with a ChromaVision MA100 Multi-Angle Spectrophotometer (manufactured by X-Rite, Incorporated, Grandville, Mich.). L is a common measure of whiteness on the CIELAB colorspace. The L value was measured at 4 places on the plaque, both front and back and the L values averaged. A determination of L also was performed on an untreated plaque. A ΔL value was determined by subtracting the average of the four L measurements of the untreated plaque from the average of the four measurements from the treated plaque. After 7 days, the second plaque was removed from the chamber and the L value and ΔL value determined. Low L values correspond to darker plaques and higher L values correspond to lighter plaques. Therefore a positive ΔL means a change from darker to lighter.

A survey found that, by visual observation, those of ordinary skill in the art could identify three levels of whitening, listed in Table B, corresponding to the ΔL values determined by spectroscopic measurements means. Thus, using this relationship in some examples, visual observation was used to evaluate whitening where the L values could not be conveniently measured.

TABLE B

Characterization of Whitening

| Visual observation | ΔL (110°) |
|---|---|
| none | ΔL < 5 |
| slight | 5 < ΔL < 15 |
| moderate | 15 < ΔL < 25 |
| severe | ΔL > 25 |

$^1$H NMR Method for Epoxy Conversion

The 1H spectra were recorded in $CDCl_3$ on Bruker 500 MHz NMR Spectrometer operating at 500 MHz. The percent conversion of the epoxy functionality in the polyepoxy compound was determined by measuring the $^1$H NMR signal of one of the epoxy ring hydrogen diastereomers versus a second internal standard signal that does not change during the reaction with polyhydroxy compound. The ratio of the epoxy ring hydrogen signal to the standard signal, adjusted for the moles of epoxy functionality and standard in the starting composition, and number of hydrogens in the standard signal, is used to determine the % conversion. For instance, with trimethylolpropane triglycidyl ether (TTE), the methyl group of the TTE is chosen as the internal standard signal (0.80 ppm) and one of the epoxy hydrogen diastereomers (2.55 ppm) is the epoxy signal measured. The following calculation provides the % conversion:

$$\text{Epoxy Conversion (\%)} = 100 - \frac{\text{Area peak at 2.55 ppm (broad } \underline{CH_2}, TTE \text{ epoxy ring)}}{\text{Area peak at 0.80 ppm (broad } \underline{CH_3}CH_2-, TTE)} \times 100$$

In this case no adjustment of the ratio is needed as there are three equivalent epoxy groups each having one equivalent diastereomner hydrogen and three equivalent methyl hydrogens in the internal standard.

Mechanical Tensile Properties

Mechanical tensile properties, i.e. E-modulus, stress at break (Tensile strength) and strain at break (elongation at break) were measured according to ISO 527-2/1BA. Measurements were made on 2 mm thick injection molded ISO tensile bars at a testing speed of 5 mm/min. Mold temperature for PA 66/6T and PA 66 test specimens was 80° C.

Air Oven Ageing (AOA)

The test specimens were heat aged in a re-circulating air ovens (Heraeus type UT6060) according to the procedure detailed in ISO 2578. At various heat aging times, the test specimens were removed from the oven, allowed to cool to room temperature and sealed into aluminum lined bags until ready for testing. The tensile mechanical properties were then measured according to ISO 527 using a Zwick tensile instrument. The average values obtained from 5 specimens are given in the Tables.

Size Exclusion Chromatography (SEC)

SEC analysis was performed in ° MAC as mobile phase with polymethyl methacrylate as standard, using a refractometer as detector.

Polyetherol Hydroxyl Equivalent Weight

Hydroxyl equivalent molecular weight was calculated using total weight of polyepoxy+polyol divided by total moles of hydroxyl group within the polyol portion. This calculation was based on the fact that the reaction of each hydroxyl group with epoxy group provides another hydroxyl group, such that the total mole of hydroxyl group does not change significantly in the polyepoxy+polyol mixture.

Materials

Polyamide B refers to PA66/6T (75/25 molar ratio repeat units) with amine ends approximately 80 meq/kg, having a typical relative viscosity (RV) of 41, according to ASTM D-789 method, and a typical melt point of 268° C., that was provided according to the following procedure:

Polyamide 66 salt solution (3928 lbs. of a 51.7 percent by weight with a pH of 8.1) and 2926 lbs of a 25.2% by weight of polyamide 6T salt solution with a pH of 7.6 were charged into an autoclave with 100 g of a conventional antifoam agent, 20 g of sodium hypophosphite, 220 g of sodium bicarbonate, 2476 g of 80% HMD solution in water, and 1584 g of glacial acetic. The solution was then heated while the pressure was allowed to rise to 265 psia at which point, steam was vented to maintain the pressure at 265 psia and heating was continued until the temperature of the batch reached 250° C. The pressure was then reduced slowly to 6 psia, while the batch temperature was allowed to further rise to 280-290° C. The pressure was then held at 6 psia and the temperature was held at 280-290° C. for 20 minutes. Finally, the polymer melt was extruded into strands, cooled, and cut into pellets.

PA66 refers to an aliphatic polyamide made of 1,6-hexanedioic acid and 1,6-hexamethylenediamine having a typical relative viscosity of 49 and a melting point of about 263° C., commercially available from E.I. DuPont de Nemours and Company, Wilmington, Del., USA under the trademark Zyter® 101NC010 polyamide.

PA 6 refers to Ultramid® B27 polyamide 6 resin (polycaprolactam) available from BASF Corporation, Florham Park, N.J., 07932.

Glass fibers A refer NEG D187H glass fibers manufactured by Nippon Electric Glass, Osaka, Japan.

Glass fiber B refers to CPIC 301HP chopped glass fiber available from Chongqing Polycomp International Corp., Chongqing, China.

Black Pigment A refers to ZYTEL® FE3786 BK031C black concentrate, a 40 wt % nigrosine black pigment concentrate in a PA66 carrier.

Black Pigment B refers ZYTEL® FE3779 BK031C black concentrate, a 25 wt % carbon black in a PA6 carrier.

Cu heat stabilizer refers to a mixture of 7 parts of potassium iodide and 1 part of copper iodide in 0.5 part of aluminum stearate wax binder.

Kemamide E180 lubricant is N-stearylerucamide, CAS No. [10094-45-8], available from Chemtura Corp., Philadelphia, Pa.

Plasthall 809 is a polyethylene glycol 400 di-2-ethyl-hexoate available from C.P. Hall Company, Chicago, Ill. 60606.

TRX®301 copolymer refers to a maleic anhydride modified EPDM from available from E.I. DuPont de Nemours and Company, Wilmington, Del., USA.

DPE refers to dipentaerythritol that was from Sigma-Aldrich, St. Louis, Mo., United States.

TTE refers to trimethylolpropane triglycidyl ether from Sigma-Aldrich.

DTP refers to di(trimethylol)propane from Sigma-Aldrich.

THP refers to 1,1,1-tris(hydroxymethyl)propane from Sigma-Aldrich.

THE refers to 1,1,1-tris(hydroxymethyl)ethane from Sigma-Aldrich.

GLY refers to glycerol from Sigma-Aldrich.

BDE refers to 1,4-butanediol diglycidyl ether from Sigma-Aldrich.

BADGE refers to bisphenol A diglycidyl ether from Sigma-Aldrich. Polyetherol A (DPE-TTE):

In a 3-neck round bottom flask, DPE (254 equivalent weight, 270 g, 1.1 mots) was heated under an atmosphere of nitrogen for 1.5 hours in an oil bath heated to 235° C. to provide a melt. TTE (302 equivalent weight, 160 g, 0.53 mols) was added dropwise over 25 minutes to a stirred vortex of the DPE melt. The mixture was stirred and additional 10 minutes. The flask was removed from the oil bath, and while still molten, the mixture was poured into an aluminum tray and allowed to cool to room temperature to provide an orange glassy solid. The solid was hammered into fragments and ground to provide a powder. The resulting powder dissolved in all solvents (MeOH, DMAC, DMSO) with sonication; SEC Mw/Mn=124076/4856 g/mol;

Hydroxyl equivalent molecular weight of Polyetherol $A =$ $$\frac{W_{DPE} + W_{TTE}}{6 \times M_{DPE}} = 65.1;$$

Epoxy conversion was 100% as determined with NMR analysis:

Epoxy Conversion (%) =

$$100 - \frac{\text{Area peak at 2.55 ppm (broad } \underline{CH2}, \textit{TTE} \text{ epoxy ring)}}{\text{Area peak at 0.80 ppm (broad } \underline{CH3}CH2 -, \textit{TTE})} \times 100.$$

Polyetherol B (DTP+TTE)

Using a similar method as disclosed above, DTP (250 equivalent weight, 250 g, 1 mols) was heated under an atmosphere of nitrogen for 1.5 hours in an oil bath heated to 180° C. to provide a melt. TTE (302 equivalent weight, 140 g, 0.46 mols) was added dropwise over 25 minutes to a stirred vortex of the DTP melt and the mixture stirred and additional 3 hours. The resulting powder was soluble in DMAC; SEC Mw/Mn=4105/2333 [g/mol];

Hydroxyl equivalent molecular weight of Polyetherol $B =$ $$\frac{W_{DTP} + W_{TTE}}{4 \times M_{DTP}} = 97.5;$$

Epoxy conversion was 90% as determined with NMR analysis:

Epoxy conversion (%) =

$$100 - \frac{\text{Area peak at 2.60 ppm (broad } \underline{CH2}, \textit{TTE} \text{ epoxy ring)}}{\text{Area peak at 0.80 ppm (broad } \underline{CH3}CH2 -, \textit{TTE} + \textit{DTP})/5.34} \times 100.$$

The conversion determination used an internal methyl signal that included the methyls from TTE and the DTP, and thus the ratio was adjusted for the moles of both components present.

Polyetherol C (THP+TTE)

Using a similar method as disclosed above, THP (134 equivalent weight, 175 g, 1.3 mols) was heated under an atmosphere of nitrogen for 1.5 hours in an oil bath heated to 180° C. to provide a melt. TTE (302 equivalent weight, 212 g, 0.7 mols) was added dropwise over 25 minutes to a stirred vortex of the THP melt. The mixture was stirred and additional 3 hours. The resulting thick oil was soluble in DMAC; SEC Mw/Mn=690912620 g/mol;

Hydroxyl equivalent molecular weight of Polyetherol $C =$ $$\frac{W_{THP} + W_{TTE}}{3 \times M_{THP}} = 99.2;$$

Epoxy conversion was 93% as determined with NMR analysis:

Epoxy Conversion (%) = 100 −

$$\frac{\text{Area peak at 2.60 ppm (broad } \underline{CH2}, \textit{TTE} \text{ epoxy ring)}}{\text{Area peak at 0.80 ppm (broad } \underline{CH3}CH2 -, \textit{TTE} + \textit{THP})/2.86} \times 100.$$

The conversion determination used an internal methyl signal that included the methyls from TTE and THP, and thus the ratio was adjusted for the moles of both components present.

Polyetherol D (THE+TTE)

Using a similar method as disclosed above, THE (120 equivalent weight, 200 g, 1.67 mols) was heated under an atmosphere of nitrogen for 1.5 hours in an oil bath heated to 200° C. to provide a melt. TTE (302 equivalent weight, 237 g, 0.78 moss) was added dropwise over 25 minutes to a stirred vortex of the THE melt. The mixture was stirred and additional 3 hours. The resulting thick oil was soluble in DMAC; SEC Mw/Mn=8625/2837 g/mol;

Hydroxyl equivalent molecular weight of Polyetherol $D =$ $$\frac{W_{THE} + W_{TTE}}{3 \times M_{THE}} = 87.2;$$

Epoxy conversion was 90% as determined with NMR analysis:

$$\text{Epoxy Conversion (\%)} = 100 - \frac{\text{Area peak at 2.60 ppm (broad } \underline{CH2}, \text{ } TTE \text{ epoxy ring)}}{\text{Area peak at 0.80 ppm (broad } \underline{CH3}CH2-, TTE + \underline{CH3}-, THE)/3.14} \times 100.$$

The conversion determination used an internal methyl signal that included the methyls from TTE and THE, and thus the ratio was adjusted for the moles of both components present.

Polyetherol E (GLY+BDE)

Using a similar method as disclosed above, a mixture of GLY (92 equivalent weight, 100 g, 1.1 mots), BDE (202 equivalent weight, 181 g, 0.89 cools) and $Na_3PO_4 \cdot 12H_2O$ (380 equivalent weight, 5.62 g, 0.015 mols) was heated under an atmosphere of nitrogen for 3 hours in an oil bath heated to 120° C. The resulting thick oil was soluble in DMAC [SEC Mw/Mn=14472/5066 g/mol;

$$\text{Hydroxyl equivalent molecular weight of Polyetherol } E = \frac{W_{GLY} + W_{BDE}}{3 \times M_{GLY}} = 85.1;$$

Epoxy conversion was 100%:

$$\text{Epoxy Conversion (\%)} = 100 - \frac{\text{Area peak at 2.50 ppm (broad } \underline{CH2}, BDE \text{ epoxy ring)}}{\text{Area peak at 1.57 ppm (broad } \underline{CH2}CH2O-, BDE)/2} \times 100.$$

The conversion determination used an internal methylene signal that included two methylenes of BDE, and thus the ratio was adjusted.

Polyetherol F (GLY+BADGE)

Using a similar method as disclosed above, a mixture of GLY (92 equivalent weight, 100 g, 1.1 mols), BADGE (340 equivalent weight, 196 g, 0.58 mols) and $Na_3PO_4 \cdot 12H_2O$ (380 equivalent weight, 5.62 g, 0.015 mols) was heated under an atmosphere of nitrogen for 8 hours in an oil bath heated to 160° C. The resulting thick oil was soluble in DMAC; SEC Mw/Mn=14058/5844 g/mol;

$$\text{Hydroxyl equivalent molecular weight of Polyetherol } F = \frac{W_{GLY} + W_{BADGE}}{3 \times M_{GLY}} = 89.7;$$

Epoxy conversion was 86%:

$$\text{Epoxy Conversion (\%)} = 100 - \frac{\text{Area peak at 2.70 ppm (broad } \underline{CH2}, \text{ BADGE epoxy ring)}}{\text{Area peak at 6.81 ppm (broad } \underline{CH}, \text{ BADGE aromatic ring)}/2} \times 100.$$

The conversion determination used an internal aromatic hydrogen signal that included four hydrogens of BADGE, and thus the ratio was adjusted.

Polyetherol G (GLY+TTE)

Using a similar method as disclosed above, a mixture of GLY (92 equivalent weight, 100 g, 1.1 mols), TTE (302 equivalent weight, 217 g, 0.72 mols) and $Na_3PO_4 \cdot 12H_2O$ (380 equivalent weight, 5.62 g, 0.015 mols) was heated under an atmosphere of nitrogen for 8 hours in an oil bath heated to 180° C. The resulting thick oil was soluble in DMAC; SEC Mw/Mn=35223/7202 g/mol;

$$\text{Hydroxyl equivalent molecular weight of Polyetherol } G = \frac{W_{GLY} + W_{TTE}}{3 \times M_{GLY}} = 96.1;$$

Epoxy conversion was 100%:

$$\text{Epoxy Conversion (\%)} = 100 - \frac{\text{Area peak at 3.10 ppm (broad } \underline{CH}CH2-, TTE \text{ epoxy ring)}}{\text{Area peak at 0.80 ppm (broad } \underline{CH3}CH2-, TTE)} \times 100.$$

Poly(Dipenterythritol)

The procedure to make poly(dipentaerythritol) ((poly (DPE)), disclosed in Example 1 of U.S. Pat. No. 2,462,047, was followed using $H_3PO_4$ catalyst. The product of this condensation was used in a comparative example.

EXAMPLES

Examples 1 and 2 illustrate the AOA tensile strength retention performance of PA 66/66T in the presence of Polyetherol A derived from reaction of DPE and TTE. Both Examples show significantly higher tensile strength retention over comparative example C-1, absent Polyetherol A. Examples 1 and 2 showed no whitening after treatment in an environmental chamber under conditions of 85% relative humidity and 85° C. for seven days, whereas Example C-4, having DPE and TTE added in the extruder, that is, absent pre-reaction, showed severe whitening.

TABLE 1

| Example | C-1 | C-2 | C-3 | C-4 | 1 | 2 |
|---|---|---|---|---|---|---|
| Polyamide B (66/6T) | 63.40 | 60.40 | 60.40 | 59.40 | 60.40 | 57.40 |
| Black Pigment A | 0.60 | 0.60 | 0.60 | 0.60 | 0.60 | 0.60 |
| Black Pigment B | 0.60 | 0.60 | 0.60 | 0.60 | 0.60 | 0.60 |
| Glass Fiber B | 35.0 | 35.0 | 35.0 | 35.0 | 35.0 | 35.0 |
| Kemamide E180 | 0.10 | 0.10 | 0.10 | 0.10 | 0.10 | 0.10 |
| Cu Heat Stabilizer | 0.30 | 0.30 | 0.30 | 0.30 | 0.30 | 0.30 |
| Dipentaerythritol | | 3.00 | | 3.00 | | |
| Poly(DPE) (DPE + $H_3PO_4$ catalyst) | | | 3.00 | | | |
| TTE | | | | 1.00 | | |
| Polyetherol A (DPE + TTE) | | | | | 3.00 | 6.00 |
| Whiteness Measurement (L value at 110° reflection) | | | | | | |
| ΔL (110°), 24 h | 2.26 | 22.38 | 2.07 | 7.71 | −0.11 | −2.79 |
| Visual observation, 24 h | none | moderate | none | slight | none | none |
| ΔL (110°), 7 days | 1.23 | 58.90 | 0.43 | 35.68 | −0.15 | −2.77 |
| Visual observation, 7 days | none | severe | none | severe | none | none |
| Tensile Properties, Dry-As-Molded | | | | | | |
| Tensile Strength [MPa] | 225 | 227 | 215 | 220 | 220 | 200 |
| Elongation at Break [%] | 4.3 | 4.1 | 4.1 | 4.0 | 4.1 | 3.4 |
| Tensile Properties, AOA 500 hrs at 230° C. | | | | | | |
| Tensile Strength [MPa] | 68 | 199 | 165 | 232 | 177 | 209 |
| Tensile Strength Retention [%] | 30% | 88% | 77% | 105% | 80% | 105% |
| Elongation at Break [%] | 1.0 | 2.8 | 2.3 | 3.7 | 2.3 | 3.3 |
| Elongation Retention [%] | 23% | 69% | 55% | 94% | 57% | 99% |
| Tensile Properties, AOA 1000 hrs at 230° C. | | | | | | |
| Tensile Strength [MPa] | 12 | 61 | 36 | 174 | 102 | 165 |
| Tensile Strength Retention [%] | 5% | 27% | 17% | 79% | 46% | 83% |
| Elongation at Break [%] | 0.2 | 1.0 | 0.7 | 2.7 | 1.8 | 2.7 |
| Elongation Retention [%] | 4% | 25% | 17% | 67% | 42% | 80% |

TABLE 2

| | Example | | | |
|---|---|---|---|---|
| | C-1 | 3 | 4 | 5 |
| Polyamide B (66/6T) | 63.40 | 60.40 | 60.40 | 60.40 |
| Black Pigment A | 0.60 | 0.60 | 0.60 | 0.60 |
| Black Pigment B | 0.60 | 0.60 | 0.60 | 0.60 |
| Glass Fiber B | 35.00 | 35.00 | 35.00 | 35.00 |
| Kemamide E180 | 0.10 | 0.10 | 0.10 | 0.10 |
| Cu Heat Stabilizer | 0.30 | 0.30 | 0.30 | 0.30 |
| Polyetherol B (DTP + TTE) polyetherol | | 3.00 | | |
| Polyetherol C (THP + TTE) polyetherol | | | 3.00 | |
| Polyetherol D (THE + TTE) polyetherol | | | | 3.00 |
| Whiteness Measurement (L value at 110° reflection) | | | | |
| ΔL (110°), 24 h | 2.26 | 1.40 | 2.93 | 1.20 |
| Visual observation, 24 h | none | none | none | none |
| ΔL (110°), 7 days | 1.23 | 6.17 | −0.71 | −0.61 |
| Visual observation, 7 days | none | none | none | none |
| Tensile Properties, Dry-As-Molded | | | | |
| Tensile Strength [MPa] | 225 | 235 | 226 | 228 |
| Elongation at Break [%] | 4.3 | 4.0 | 3.9 | 4.1 |
| Tensile Properties, 500 h at 230° C. | | | | |
| Tensile Strength [MPa] | 68 | 231 | 220 | 217 |
| Tensile Strength Retention [%] | 30% | 98% | 97% | 95% |
| Elongation at Break [%] | 1.0 | 3.4 | 3.4 | 3.5 |
| Elongation Retention [%] | 23% | 84% | 86% | 84% |
| Tensile Properties, 1000 h at 230° C. | | | | |
| Tensile Strength [MPa] | 12 | 179 | 142 | 130 |
| Tensile Strength Retention [%] | 5% | 76% | 63% | 57% |
| Elongation at Break [%] | 0.2 | 2.7 | 2.1 | 3.0 |
| Elongation Retention [%] | 4% | 67% | 54% | 72% |

TABLE 3

| Example | C-5 | C-6 | 6 | 7 | 8 | 9 |
|---|---|---|---|---|---|---|
| Polyamide B (66/6T) | 55.90 | 52.90 | 52.90 | 52.90 | 52.90 | 52.90 |
| PA6 | 5.00 | 5.00 | 5.00 | 5.00 | 5.00 | 5.00 |
| TRX-301 | 2.50 | 2.50 | 2.50 | 2.50 | 2.50 | 2.50 |
| Black Pigment A | 0.60 | 0.60 | 0.60 | 0.60 | 0.60 | 0.60 |
| Black Pigment B | 0.60 | 0.60 | 0.60 | 0.60 | 0.60 | 0.60 |
| Glass Fiber B | 35.00 | 35.00 | 35.00 | 35.00 | 35.00 | 35.00 |
| Kemamide E180 | 0.10 | 0.10 | 0.10 | 0.10 | 0.10 | 0.10 |
| Cu Heat Stabilizer | 0.30 | 0.30 | 0.30 | 0.30 | 0.30 | 0.30 |
| Dipentaerythritol | | 3.00 | | | | |
| Polyetherol E (GLY + BDE) | | | 3.00 | | | |
| Polyetherol F (GLY + BADGE) | | | | 3.00 | | |

TABLE 3-continued

| Example | C-5 | C-6 | 6 | 7 | 8 | 9 |
|---|---|---|---|---|---|---|
| Polyetherol G (GLY + TTE) | | | | | 3.00 | |
| Polyetherol B | | | | | | 3.00 |
| Whiteness Measurement (L value at 110° reflection) | | | | | | |
| ΔL (110°), 24 h | −2.60 | NA | NA | NA | NA | −2.34 |
| Visual observation, 24 h | none | NA | NA | NA | NA | none |
| ΔL (110°), 7 days | 0.21 | NA | NA | NA | NA | −0.54 |
| Visual observation, 7 days | none | NA | NA | NA | NA | none |
| Tensile Properties, Dry-As-Molded | | | | | | |
| Tensile Strength [Mpa] | 204 | 188 | 184 | 198 | 220 | 202 |
| Elongation at Break [%] | 4.5 | 4.1 | 4.0 | 3.7 | 3.8 | 3.6 |
| Tensile Properties, 500 h at 230° C. | | | | | | |
| Tensile Strength [MPa] | 104 | 172 | 149 | 176 | 200 | 194 |
| Tensile Strength Retention [%] | 51% | 91% | 81% | 89% | 91% | 96% |
| Elongation at Break [%] | 1.5 | 2.7 | 2.3 | 2.5 | 2.7 | 3.2 |
| Elongation Retention [%] | 33% | 65% | 58% | 66% | 71% | 89% |
| Tensile Properties, 1000 h at 230° C. | | | | | | |
| Tensile Strength [MPa] | 17 | 106 | 115 | 128 | 167 | 166 |
| Tensile Strength Retention [%] | 8% | 56% | 63% | 65% | 76% | 82% |
| Elongation at Break [%] | 0.2 | 1.7 | 2.7 | 2.0 | 2.5 | 2.5 |
| Elongation Retention [%] | 4% | 41% | 69% | 54% | 66% | 69% |

NA = not available

TABLE 4

| | Examples | | |
|---|---|---|---|
| | C-7 | 10 | 11 |
| PA 66 | 57.90 | 54.90 | 53.65 |
| PA 6 | 5.00 | 5.00 | 5.00 |
| Glass Fiber A | 35.00 | 35.00 | 35.00 |
| Cu Heat Stabilizer | 0.40 | 0.40 | 0.40 |
| Black Pigment A | 0.60 | 0.60 | 0.60 |
| Black Pigment B | 1.00 | 1.00 | 1.00 |
| Kemamide E180 | 0.10 | 0.10 | 0.10 |
| Polyetherol B | | 3.00 | 3.00 |
| Plasthall 809 | | | 1.25 |
| Tensile Properties, Dry-As-Molded | | | |
| Tensile Strength [MPa] | 196 | 202 | 198 |
| Elongation [%] | 3.7 | 3.2 | 3.3 |
| Tensile Properties, 500 h at 210° C. | | | |
| Tensile Strength [MPa] | 185 | 233 | 227 |
| Tensile Strength Retention [%] | 94% | 116% | 115% |
| Elongation [%] | 2.5 | 3.6 | 3.3 |
| Elongation Retention [%] | 69% | 114% | 100% |
| Tensile Properties, 1000 h at 210° C. | | | |
| Tensile Strength [MPa] | 89 | 179 | 206 |
| Tensile Strength Retention [%] | 45% | 88% | 104% |
| Elongation [%] | 1.7 | 3.5 | 4.4 |
| Elongation Retention [%] | 45% | 110% | 135% |
| Tensile Properties, 500 h at 230° C. | | | |
| Tensile Strength [MPa] | 43 | 212 | 216 |
| Tensile Strength Retention [%] | 22% | 105% | 109% |
| Elongation [%] | 0.9 | 3.1 | 3.2 |
| Elongation Retention [%] | 24% | 97% | 97% |

We claim:

1. A thermoplastic melt-mixed composition comprising:
a) a polyamide resin;
b) 1 to 10 weight percent of a polyetherol compound provided by reacting:
b1) 10 to 90 weight percent of one or more polyepoxy compound having at least two or more epoxy groups; the polyepoxy compound having a epoxide equivalent weight of 43 to 1000 g/equivalent as determined by calculation, or if an oligomer is used, by titration using ASTM D1652-11 method; and
b2) 90 to 10 weight percent one or more polyhydric alcohols having two or more hydroxyl groups and a having hydroxyl equivalent weight of 30 to 1000 g/equivalent as determined by hydroxyl number calculation, or if an oligomer is used by determination of the hydroxyl number according to ASTM E 1899-08, wherein the weight percent of b1) and b2) is based on the total weight of b1) and b2);
said polyetherol compound having a range of at least 10 percent conversion of epoxy equivalents of component (b1) up to, but excluding, the gel point of the components b1) and b2), as determined with $^1$H NMR analysis of the polyetherol; and a number average molecular weight ($M_n$) of at least 200 to about 10,000 as determined with size exclusion chromatography;
c) 10 to 60 weight percent of reinforcing agent;
d) 0 to 30 weight percent polymeric toughener; and
e) 0 to 10 weight percent further additives;
wherein all weight percentages are based on the total weight of the polyamide composition.

2. The thermoplastic melt-mixed composition of claim 1 wherein the polyetherol has a $M_n$ of about 400 to about 8000.

3. The thermoplastic melt-mixed composition of claim 1 wherein said polyetherol compound has at least 25 percent conversion of epoxy equivalents.

4. The thermoplastic melt-mixed composition of claim 1 wherein said polyetherol compound has hydroxyl equivalent weight of about 50 to 1000.

5. The thermoplastic melt-mixed composition of claim 1 wherein the reinforcing agent is selected from the group consisting of glass fiber having a circular cross-section and glass fiber with a non-circular cross-section and combinations of these.

6. The thermoplastic melt-mixed composition of claim 1 wherein the polyamide resin is a Group (III) Polyamide having a melting point of at least 230° C., and comprising:
(aa) about 20 to about 35 mole percent semiaromatic repeat units derived from monomers selected from one or more of the group consisting of:

(i) aromatic dicarboxylic acids having 8 to 20 carbon atoms and aliphatic diamines having 4 to 20 carbon atoms; and (bb) about 65 to about 80 mole percent aliphatic repeat units derived from monomers selected from one or more of the group consisting of:

(ii) an aliphatic dicarboxylic acid having 6 to 20 carbon atoms and said aliphatic diamine having 4 to 20 carbon atoms; and (iii) a lactam and/or aminocarboxylic acid having 4 to 20 carbon atoms.

7. The thermoplastic melt-mixed composition of claim 6 wherein the Group (III) polyamide is poly(hexamethylene hexanediamide/hexamethylene terephthalamide).

8. The thermoplastic melt-mixed composition of claim 1 wherein the polyamide resin is a polyamide blend of two or more polyamide resins.

9. The thermoplastic melt-mixed composition of claim 8 wherein the polyamide blend is a blend of poly(hexamethylene hexanediamide and poly(caprolactam).

10. A molded or extruded article made from the thermoplastic melt-mixed composition of claim 1.

11. The molded or extruded thermoplastic article of claim 10 wherein the polyamide resin comprises a one or more polyamides selected from the group consisting of Group (II) polyamides having a melting point of at least 210° C., and comprising an aliphatic polyimide selected from the group consisting of poly(tetramethylene hexanediamide) (PA46), poly(ε-caprolactam) (PA 6), poly(hexamethylene hexanediamide/(ε-caprolactam/) (PA 66/6) poly(hexamethylene hexanediamide) (PA 66), poly(hexamethylene hexanediamide/hexamethylene decanediamide) (PA66/610), poly(hexamethylene hexanediamide/hexamethylene dodecanediamide) (PA66/612), poly(hexamethylene hexanediamide/decamethylene decanediamide) (PA66/1010), poly(hexamethylene decanediamide) (PA610), poly(hexamethylene dodecanediamide) (PA612), poly(hexamethylene tetradecanediamide) (PA614), and poly(tetramethylene hexanediamide/2-methylpentamethylene hexanediamide) (PA46/D6); wherein within Group (II) Polyamides are Group (IIA) Polyamides having a melting point of at least 210° C. and less than 230° C. and Group (IIB) Polyamides having a melting point of 230° C. or greater;

Group (III) polyamides having a melting point of at least 230° C., and comprising (aa) about 20 to about 35 mole percent semiaromatic repeat units derived from monomers selected from one or more of the group consisting of:

(i) aromatic dicarboxylic acids having 8 to 20 carbon atoms and aliphatic diamines having 4 to 20 carbon atoms; and (bb) about 65 to about 80 mole percent aliphatic repeat units derived from monomers selected from one or more of the group consisting of:

(ii) an aliphatic dicarboxylic acid having 6 to 20 carbon atoms and said aliphatic diamine having 4 to 20 carbon atoms; and (iii) a lactam and/or aminocarboxylic acid having 4 to 20 carbon atoms;

Group (IV) polyamides comprising (cc) about 50 to about 95 mole percent semiaromatic repeat units derived from monomers selected from one or more of the group consisting of:

(i) aromatic dicarboxylic acids having 8 to 20 carbon atoms and aliphatic diamines having 4 to 20 carbon atoms; and (dd) about 5 to about 50 mole percent aliphatic repeat units derived from monomers selected from one or more of the group consisting of:

(ii) an aliphatic dicarboxylic acid having 6 to 20 carbon atoms and said aliphatic diamine having 4 to 20 carbon atoms; and (iii) a lactam and/or aminocarboxylic acid having 4 to 20 carbon atoms;

Group (V) polyamides having a melting point of at least 260° C., comprising (ee) greater than 95 mole percent semiaromatic repeat units derived from monomers selected from one or more of the group consisting of:

(i) aromatic dicarboxylic acids having 8 to 20 carbon atoms and aliphatic diamines having 4 to 20 carbon atoms; and (ff) less than 5 mole percent aliphatic repeat units derived from monomers selected from one or more of the group consisting of:

(ii) an aliphatic dicarboxylic acid having 6 to 20 carbon atoms and said aliphatic diamine having 4 to 20 carbon atoms;

(iii) a lactam and/or aminocarboxylic acid having 4 to 20 carbon atoms;

wherein 2 mm thick test bars, prepared from said melt-mixed composition and tested according to ISO 527-2/1 BA, and exposed at a test temperature of 230° C. for a test period of 1000 hours, in an atmosphere of air, have on average, a retention of tensile strength of at least 40 percent, as compared with that of an unexposed control of identical composition and shape.

12. A process for providing a thermoplastic melt-mixed composition comprising:

melt-mixing:

a) a polyamide resin;

b) 1 to 10 weight percent of a polyetherol compound provided by reacting:

b1) 10 to 90 weight percent of one or more polyepoxy compound having at least two or more epoxy groups; the polyepoxy compound having a epoxide equivalent weight of 70 to 1000 g/equivalent as determined by calculation, or if an oligomer is used, by titration using ASTM D1652-11 method; and b2) 90 to 10 weight percent one or more polyhydric alcohols having two or more hydroxyl groups and a having hydroxyl equivalent weight of 30 to 1000 g/equivalent as determined by hydroxyl number calculation, or if an oligomer is used by determination of the hydroxyl number according to ASTM E 1899-08, wherein the weight percent of a) and b) is based on the total weight of a) and b);

said polyetherol compound having a range of at least 10 percent conversion of epoxy equivalents of component b1) up to, but excluding, the gel point of the components b1) and b2) as determined with $^1$H NMR analysis of the polyetherol; and a number average molecular weight ($M_n$) of at least 200 to about 10,000 as determined with size exclusion chromatography; 10 to 60 weight percent of reinforcing agent;

c) 0 to 30 weight percent polymeric toughener; and d) 0 to 10 weight percent further additives;

extruding the thermoplastic melt-mixed composition in the form of laces or strands, cooling the laces or strands; and chopping or breaking the laces or strands into granules.

* * * * *